A. C. WELLS.
TRANSMISSION GEAR.
APPLICATION FILED MAR. 16, 1916.

1,214,855. Patented Feb. 6, 1917.
2 SHEETS—SHEET 1.

A. C. WELLS.
TRANSMISSION GEAR.
APPLICATION FILED MAR. 16, 1916.

1,214,855.

Patented Feb. 6, 1917.
2 SHEETS—SHEET 2.

Arthur C. Wells, Inventor
By his Attorney,
W. P. Hutchinson.

UNITED STATES PATENT OFFICE.

ARTHUR C. WELLS, OF AMITYVILLE, NEW YORK.

TRANSMISSION-GEAR.

1,214,855.  Specification of Letters Patent.  Patented Feb. 6, 1917.

Application filed March 16, 1916. Serial No. 84,582.

*To all whom it may concern:*

Be it known that I, ARTHUR C. WELLS, a citizen of the United States, and a resident of Amityville, Suffolk county, New York, have invented a new and useful Improvement in Transmission-Gears, of which the following is a full, clear, and exact description.

My invention relates to improvements in transmission driving gears, and the object of my invention is to produce a simple, positive transmission gear adapted to connect two shafts so that all the transmitting gears shall be always in mesh, but with the gearing arranged in such a way that the second shaft may remain stationary or may be rotated in either direction and at many different speeds.

In carrying out this idea I provide the first and second shafts with fixed gears, and connect the two gears by intermediate gears on opposite sides of the axis of the main gears, and arrange the parts so that the intermediate gears may revolve bodily with the main gears and on the axis of the latter, or the intermediate gears can turn on their own axes. In one case the intermediate gears simply serve as links to connect the main gears so that the main gears will turn together and in the same direction, while in the other case the intermediate gears turning on their own axes will transmit motion to the second of the main gears but will move it in a direction opposite to the movement of the gear on the first shaft. Furthermore I provide means for checking the intermediate gears from rotating bodily, but at the same time permitting them to turn on their axes and also means for checking them against axial rotation but permitting them to turn bodily with the axes of the main gears. I also provide the checking or braking means so that it can be made to act positively to prevent all movement, or can slip so that movement will be permitted but with changes of speed. All of which will be clearly understood from the description which follows.

In any event, the gears of the transmission are always in mesh so that there is no danger of stripping the gears, and the transmitted motion is easy and also easily controlled.

Reference is to be had to the accompanying drawings forming a part of this specification, in which similar reference characters indicate corresponding parts in all the views.

Figure 3:
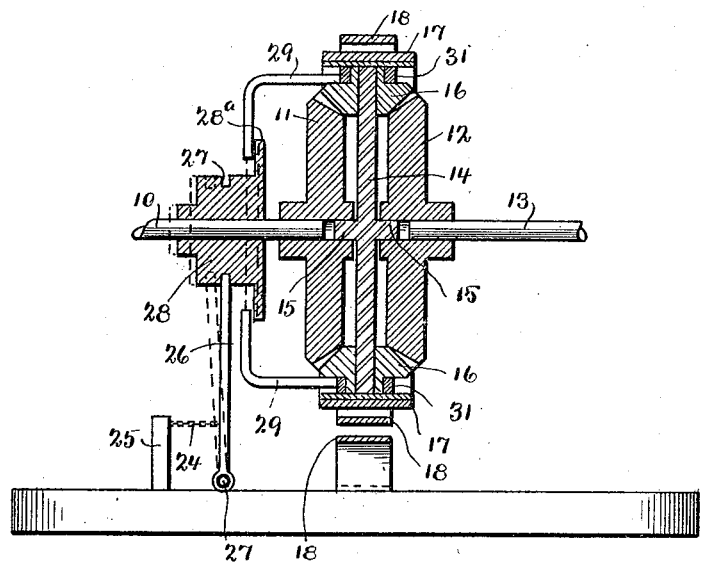
Fig. 3 is a vertical longitudinal section through the transmission.

The shaft 10 is one of the main shafts, and in many forms of transmission this will represent the engine shaft, and it is provided with a bevel gear wheel 11 which is fast to the shaft. A corresponding gear wheel 12 is fast to the second shaft 13, which in many forms of construction would represent the drive shaft. It will be noticed that the shafts 10 and 13 aline longitudinally and have a common axis of rotation, although they are independent. Between the gears 11 and 12 is a spider frame 14 which can turn on an axis alining with the axes of the shafts 10 and 13, and as a matter of convenience the spider frame is shown with trunnions 15 turning in the hubs of the gears 11 and 12. The gears 11 and 12 are connected by the intermediate gears or pinions 16 which are on opposite sides of the axis of the gears 11 and 12, and which are journaled to turn on their own axes as shown clearly in Fig. 3. The spider frame 14 is provided with a braking surface 17 which should be in the form of a band and of suitable material, the member or band 17 being fast to the frame 14.

Figure 2:
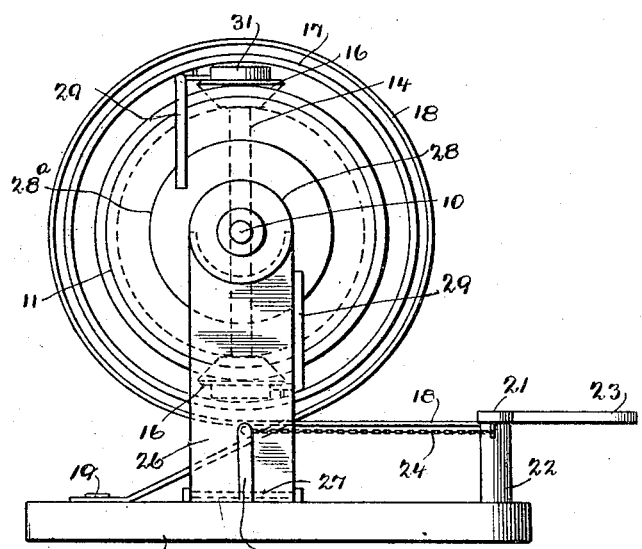
Fig. 2 is an end view of the same.

Opposite the braking surface or band 17 is a shoe 18 which can be any form of brake shoe, and can have any preferred means of operation. To show an operative structure I have illustrated one end of it made fast as shown at 19 in Fig. 2, to a support 20, while the shoe encircles the band or drum 17, one portion passing through the shoe beneath the drum as in Fig. 2, and the free end portion is secured to one end of a lever 21 which is mounted on a support 22 and provided with a handle 23. The opposite end of the lever 21 is connected with a chain or cable 24 which passes through the guide support 25 and connects to a swinging arm 26, this being pivoted as shown at 27 to the support 20 or corresponding support, while its upper end enters the groove 27 in the collar 28 which slides freely on the shaft 10. The collar is preferably provided with a flange 28ᵃ which engages the inwardly bent ends of the arms 29, and these each have a connection as shown at 30 with a brake band 31 which encircles the hub 32 of one of the intermediate gears or pinions 16. The opposite end portion 33 of the band 31 extends parallel with the member 30 and is secured to a convenient support, as for instance the member 17.

When in neutral or normal position the rotation of the shaft 10 turns the gear wheel 11, which in turn rotates the intermediate gears or pinions 16, and the spider frame 14 and band 17 rotate with the gear wheel 11, so that no motion of any kind is transmitted to the gear wheel 12 and shaft 13, the teeth of the pinions 16 simply running around on the teeth of the gear wheel 12. If, however, the handle or lever 23 is turned to the right as in Fig. 1, it will loosen the brake shoe 18 and will pull on the cable or chain 24, thus swinging the arm 26 to the position shown by dotted lines in Fig. 3 and causing the flange 28ᵃ to pull outward on the arms 29, thereby tightening the shoes 31 upon the hubs 32 of the gears 16. The gears 16 are therefore prevented from turning on their own axes, but they form a tie or connection with the gear wheel 12 so that the gears 16 and spider frame 14 rotate on the bearings of the latter, and the gear wheel 12 and shaft 13 are rotated in the same direction as the shaft 10 and gear wheel 11.

Figure 1:
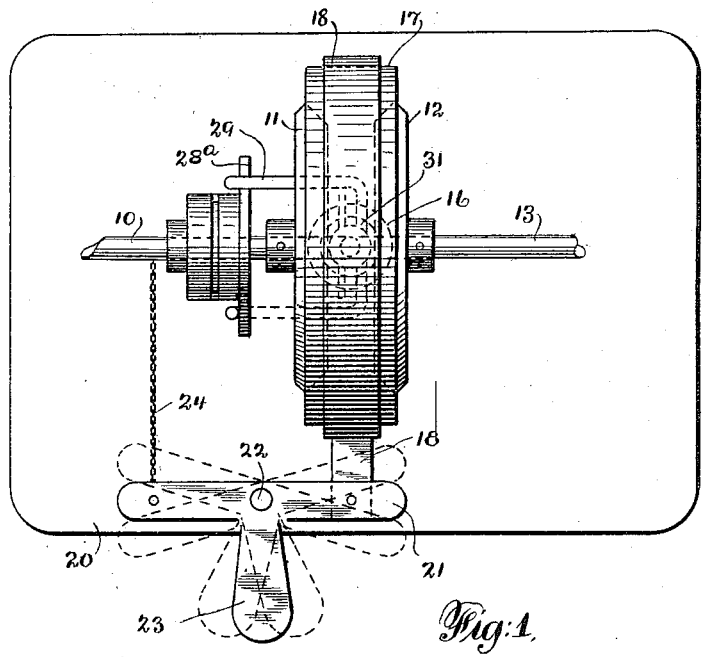
Figure 1 is a plan view of the transmission gearing embodying my invention.

If, however, the lever 23 is turned to the left as in Fig. 1, the brake shoes 31 are released, permitting the gear wheels 16 to turn on their own axes, while the brake shoe 18 is tightened against the member 17 and the spider frame 14 cannot turn, but the intermediate gears 16 will turn on their own axes, thus transmitting movement to the gear wheel 12 and shaft 13, but the movement of the latter will be in the reverse direction to the rotation of the shaft 10 and gear wheel 11.

It will be seen that when either the brake shoe 18 or the brake shoes 31 are tightened they can be made absolutely fast so as to prevent the rotation of the frame 14 or intermediate gears 16 as the case may be, or the brake shoes can be allowed to slip slightly so that the speed of the transmitted movement can be controlled, thus making the transmission extremely flexible, and as the gears 11 and 12 are always in mesh with the gears 16, there is practically no danger of stripping the gears.

I have shown and described a means for controlling the rotation of the parts 14 and 16, but it will be understood that any suitable brake mechanism can be used in connection with these parts, and my invention is not limited to any structure for this specific purpose. It will also be understood that the connected gearing may be of any usual or preferred type.

Figure 4:
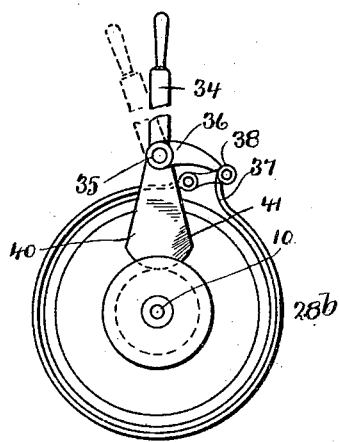
Fig. 4 is a detail of a modified means of controlling the transmission.
Figure 5:
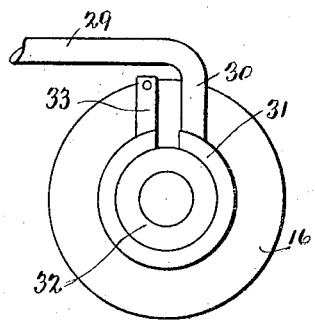
Fig. 5 is a detail of a form of brake for checking the axial rotation of one of the intermediate gears.

To illustrate the fact that the mechanism for controlling the checking or braking means above referred to can be changed, I have shown another form of controlling mechanism in Fig. 4, in which case a lever 34 is connected to a shaft 35 which can be supported in any suitable way parallel with the shafts 10 and 13. The shaft 35 has an arm 36 connected with one end of a brake shoe 37 which encircles the member 17, the parts being pivotally connected as shown at 38, while a link 39 connects the other end of the shoe 37 with the arm 36, so that the tilting the lever 34 as indicated by dotted lines, the brake shoe may be tightened or released as desired. The same shaft 35 above referred to carries a cam arm 40 which enters a groove in the collar 28ᵇ which corresponds to the collar 28, and a cam surface 41 on the arm 40 serves to move the collar in a manner to actuate the arms 29.

From the foregoing description it will be very clearly seen that many forms of controlling mechanism can be substituted for the means shown for checking or braking the member 14 and the hubs of the gears 16, without in the least affecting the principle of my invention.

I claim:—

1. A transmission comprising a shaft having a gear wheel affixed thereto, a second shaft having a gear wheel similar to and arranged opposite the first gear wheel, a frame or support rotatable between and on a common axis with the gear wheels, pinions journaled on the frame on opposite sides of the axis of the gear wheels, said pinions being in constant connection with the gear wheels, means radially opposite the frame or support for checking its rotation, and means for checking the axial rotation of the pinions.

2. A transmission comprising a shaft having a gear wheel affixed thereto, a second shaft alining with the first and having a similar gear wheel affixed to it, a frame arranged between the gear wheels and turning on an axis common to the axis of the gear wheels, said frame having a braking surface, pinions journaled on the frame and connecting with the gear wheels on opposite sides of the axis of the latter, a brake for the frame, and a brake controlling the axial rotation of the pinions.

3. A transmission comprising a shaft and a gear wheel affixed thereto, a second shaft alining with the first and having a similar gear wheel affixed thereto, a frame rotatable between the gear wheels and on an axis common to that of the gear wheels, said frame having a braking surface, a brake for said surface, pinions journaled on the frame and connecting with the gear wheels on the opposite sides of their axis, a brake controlling the axial rotation of the pinions, and a single lever having an operative connection with both the aforesaid brakes.

4. A transmission comprising a rotatable shaft having a gear wheel affixed thereto, a second shaft alining with the first shaft and having a similar gear wheel affixed thereto, a rotatable frame arranged between the gear wheels and turning on an axis common to that of the gear wheels, pinions journaled on the frame on opposite sides of the axis of the gear wheels, said pinions being in constant contact with the gear wheels, a braking surface on the aforesaid frame, a brake engaging said surface, a second brake engaging the hubs of the pinions, and means for selectively operating the aforesaid brakes.

5. A transmission comprising a shaft having a gear wheel affixed thereto, a second shaft alining with the first and having a similar gear wheel affixed thereto, a rotatable frame journaled between the gear wheels and rotating on an axis common to that of the gear wheels, pinions journaled on the frame and connecting the gear wheels, a braking surface on the frame, a brake engaging said braking surface, a brake engaging the hubs of the pinions, a sliding collar on the first mentioned shaft, an operative connection between said sliding collar and the brakes of the pinion hubs, and a lever connected with the first mentioned brake to operate it and also connected to the aforementioned collar to slide it.

ARTHUR C. WELLS.

Witnesses:
WARREN B. HUTCHINSON,
ARTHUR G. DANNELL.

Copies of this patent may be obtained for five cents each, by addressing the "Commissioner of Patents, Washington, D. C."